US012475830B2

(12) United States Patent
Jang et al.

(10) Patent No.: US 12,475,830 B2
(45) Date of Patent: Nov. 18, 2025

(54) DISPLAY APPARATUS, METHOD OF DRIVING DISPLAY PANEL USING THE SAME AND ELECTRONIC APPARATUS INCLUDING THE SAME

(71) Applicant: Samsung Display Co., Ltd., Yongin-Si (KR)

(72) Inventors: Wonwoo Jang, Yongin-si (KR); Akihiro Takegama, Yongin-si (KR); Jongha Shin, Yongin-si (KR); Kyoungho Lim, Yongin-si (KR); Yooshin Chon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/966,125

(22) Filed: Dec. 3, 2024

(65) Prior Publication Data

US 2025/0273118 A1 Aug. 28, 2025

(30) Foreign Application Priority Data

Feb. 28, 2024 (KR) ........................ 10-2024-0029274

(51) Int. Cl.
*G09G 3/20* (2006.01)

(52) U.S. Cl.
CPC ... *G09G 3/2092* (2013.01); *G09G 2310/0275* (2013.01); *G09G 2320/0233* (2013.01); *G09G 2320/0257* (2013.01); *G09G 2320/043* (2013.01); *G09G 2320/0626* (2013.01)

(58) Field of Classification Search
CPC ......... G09G 3/2092; G09G 2310/0275; G09G 2320/0233; G09G 2320/0257; G09G 2320/043; G09G 2320/0626
See application file for complete search history.

(56) References Cited

U.S. PATENT DOCUMENTS

| | | | | |
|---|---|---|---|---|
| 8,599,192 B2 * | 12/2013 | Kim | H04N 19/507 | 345/214 |
| 11,741,889 B2 * | 8/2023 | Lee | G09G 3/3233 | 345/55 |
| 11,817,029 B2 | 11/2023 | Pyun et al. | | |
| 2005/0232476 A1 * | 10/2005 | Hayakawa | G09G 3/006 | 382/141 |
| 2007/0019878 A1 * | 1/2007 | Oura | G09G 3/3611 | 382/251 |

(Continued)

FOREIGN PATENT DOCUMENTS

KR 10-2023-0017406 A 2/2023

*Primary Examiner* — Michael J Jansen, II
(74) *Attorney, Agent, or Firm* — Innovation Counsel LLP

(57) ABSTRACT

A display apparatus includes a display panel, a data driver and a driving controller. The display panel includes a plurality of display blocks. The data driver is configured to output data voltages to the display panel. The driving controller is configured to control the data driver. The driving controller is configured to calculate differences between loads of a previous frame and loads of a present frame for the display blocks for each colors, to determine whether an image is a static image or not based on the differences between the loads of the previous frame and the loads of the present frame for the display blocks for the each colors, and to reduce luminance of the image when the image is determined as the static image.

15 Claims, 15 Drawing Sheets

(56) References Cited

U.S. PATENT DOCUMENTS

| | | | | |
|---|---|---|---|---|
| 2009/0109290 | A1* | 4/2009 | Ye | G09G 3/3611<br>348/155 |
| 2013/0063428 | A1* | 3/2013 | Choi | G09G 3/342<br>345/419 |
| 2014/0063032 | A1* | 3/2014 | Chen | G09G 5/393<br>345/545 |
| 2015/0371600 | A1* | 12/2015 | Zhang | G09G 3/3611<br>345/212 |
| 2017/0078706 | A1* | 3/2017 | Van Der Vleuten | G06T 5/92 |
| 2017/0345360 | A1* | 11/2017 | Lee | G09G 3/20 |
| 2017/0345378 | A1* | 11/2017 | Ryu | G09G 3/3233 |
| 2018/0082661 | A1* | 3/2018 | Kang | G09G 3/20 |
| 2021/0035488 | A1* | 2/2021 | Seo | G09G 3/325 |
| 2021/0110774 | A1* | 4/2021 | Cho | G09G 3/3266 |
| 2021/0327332 | A1* | 10/2021 | Choi | G09G 3/3208 |
| 2022/0036856 | A1* | 2/2022 | Chen | G09G 5/10 |
| 2023/0245615 | A1* | 8/2023 | Lee | G09G 3/3233<br>345/55 |
| 2024/0013692 | A1* | 1/2024 | Ryu | G09G 3/20 |
| 2025/0061864 | A1* | 2/2025 | Dambach | G09G 3/3426 |

* cited by examiner

FRAME X-1

FRAME X-1

FRAME X-1

DISPLAY APPARATUS, METHOD OF DRIVING DISPLAY PANEL USING THE SAME AND ELECTRONIC APPARATUS INCLUDING THE SAME

PRIORITY STATEMENT

This application claims priority under 35 U.S.C. § 119 to Korean Patent Application No. 10-2024-0029274, filed on Feb. 28, 2024, in the Korean Intellectual Property Office KIPO, the contents of which are herein incorporated by reference in their entireties.

BACKGROUND

1. Field

Embodiments of the present inventive concept relate to a display apparatus, a method of driving a display panel using the display apparatus and an electronic apparatus including the display apparatus. More particularly, embodiments of the present inventive concept relate to a display apparatus determining a static image based on differences between loads of a previous frame and loads of a present frame for display blocks for each colors of the display panel to enhance an accuracy of a determination of the static image, a method of driving a display panel using the display apparatus and an electronic apparatus including the display apparatus.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls an operation of the gate driver and an operation of the data driver.

When the same image is displayed on the display panel for a long time, an afterimage may remain on the display panel. A shape of the afterimage may be determined according to a content of the input image data. Due to the afterimage, a display quality of the display panel may be deteriorated.

To prevent the deterioration of the display quality due to the afterimage, the driving controller may decrease a luminance of a display image when the same image is displayed on the display panel for a long time. When the luminance of the display image is decreased, the afterimage of the display panel may be prevented and the power consumption of the display apparatus may be reduced. However, a moving image with little movements between frames and a moving image which is dark overall may be mistakenly determined as a static image so that an inconvenience may be occurred to a user.

SUMMARY

Embodiments of the present inventive concept provide a display apparatus determining whether an image is a static image or not based on differences between loads of a previous frame and loads of a present frame for display blocks for each colors of the display panel to enhance an accuracy of a determination of the static image.

Embodiments of the present inventive concept also provide a method of driving a display panel using the display apparatus.

Embodiments of the present inventive concept also provide an electronic apparatus including the display apparatus.

In an embodiment of a display apparatus according to the present inventive concept, the display apparatus includes a display panel, a data driver and a driving controller. The display panel includes a plurality of display blocks. The data driver is configured to output data voltages to the display panel. The driving controller is configured to control the data driver. The driving controller is configured to calculate differences between loads of a previous frame and loads of a present frame for the plurality of display blocks for each colors, to determine whether an image is a static image or not based on the differences between the loads of the previous frame and the loads of the present frame for the plurality of display blocks for the each colors, and to reduce luminance of the image when the image is determined as the static image.

In an embodiment, the driving controller may be configured to determine a maximum value among absolute values of the differences between the loads of the previous frame and the loads of the present frame for the plurality of display blocks for the each colors.

In an embodiment, when a load of an X−1-th frame of a first color in a first display block is LOAD(X−1, R1), a load of an X-th frame of the first color in the first display block is LOAD(X, R1), a load of the X−1-th frame of the first color in a second display block is LOAD(X−1, R2), a load of the X-th frame of the first color in the second display block is LOAD(X, R2), a load of the X−1-th frame of the first color in an N-th display block is LOAD(X−1, RN), a load of the X-th frame of the first color in the N-th display block is LOAD(X, RN), a load of the X−1-th frame of a second color in the first display block is LOAD(X−1, G1), a load of the X-th frame of the second color in the first display block is LOAD(X, G1), a load of the X−1-th frame of the second color in the second display block is LOAD(X−1, G2), a load of the X-th frame of the second color in the second display block is LOAD(X, G2), a load of the X−1-th frame of the second color in the N-th display block is LOAD(X−1, GN), a load of the X-th frame of the second color in the N-th display block is LOAD(X, GN), a load of the X−1-th frame of a third color in the first display block is LOAD(X−1, B1), a load of the X-th frame of the third color in the first display block is LOAD(X, B1), a load of the X−1-th frame of the third color in the second display block is LOAD(X−1, B2), a load of the X-th frame of the third color in the second display block is LOAD(X, B2), a load of the X−1-th frame of the third color in the N-th display block is LOAD(X−1, BN), a load of the X-th frame of the third color in the N-th display block is LOAD(X, BN), the maximum value may be MAX(|LOAD(X−1, R1)−LOAD(X, R1)|, |LOAD(X−1, R2)−LOAD(X, R2)|, . . . , |LOAD(X−1, RN)−LOAD(X, RN)|, |LOAD(X−1, G1)−LOAD(X, G1)|, |LOAD(X−1, G2)−LOAD(X, G2)|, . . . , |LOAD(X−1, GN)−LOAD(X, GN)|, |LOAD(X−1, B1)−LOAD(X, B1)|, |LOAD(X−1, B2)−LOAD(X, B2)|, . . . , |LOAD(X−1, BN)−LOAD(X, BN)|).

In an embodiment, the driving controller may be configured to generate a sensitivity value by normalizing the maximum value to a ratio of a difference between a maximum load and a minimum load.

In an embodiment, when the sensitivity value is Δ, an absolute value of a difference between a load of an X−1-th frame of a first color in a first display block and a load of an X-th frame of the first color in the first display block is D(R1), an absolute value of a difference between a load of the X−1-th frame of the first color in a second display block and a load of the X-th frame of the first color in the second display block is D(R2), an absolute value of a difference between a load of the X−1-th frame of the first color in an N-th display block and a load of the X-th frame of the first color in the N-th display block is D(RN), an absolute value of a difference between a load of the X−1-th frame of a second color in the first display block and a load of the X-th frame of the second color in the first display block is D(G1), an absolute value of a difference between a load of the X−1-th frame of the second color in the second display block and a load of the X-th frame of the second color in the second display block is D(G2), an absolute value of a difference between a load of the X−1-th frame of the second color in the N-th display block and a load of the X-th frame of the second color in the N-th display block is D(GN), an absolute value of a difference between a load of the X−1-th frame of a third color in the first display block and a load of the X-th frame of the third color in the first display block is D(B1), an absolute value of a difference between a load of the X−1-th frame of the third color in the second display block and a load of the X-th frame of the third color in the second display block is D(B2), an absolute value of a difference between a load of the X−1-th frame of the third color in the N-th display block and a load of the X-th frame of the third color in the N-th display block is D(BN), the maximum load is MAXLO, the minimum load is MINLO and a number of the display blocks of the display panel is N, $$\Delta = \frac{\text{MAX}(D(R1), D(R2), \ldots, D(RN), D(G1), D(G2), \ldots, D(GN), D(B1), D(B2), \ldots, D(BN))}{(MAXLO - MINLO)/(N \times 3)}$$

may be satisfied.

In an embodiment, when the sensitivity value is less than a first threshold value, the driving controller may be configured to determine data of the present frame as static image data.

In an embodiment, when a maintaining time of the static image is greater than a second threshold value, the driving controller may be configured to reduce the luminance of the image In an embodiment, the driving controller may include a load calculator configured to calculate the loads of the previous frame and the loads of the present frame for the plurality of display blocks for the each colors, a load storer configured to store the loads of the previous frame for the plurality of display blocks for the each colors and a static image determiner configured to receive the loads of the present frame for the plurality of display blocks for the each colors from the load calculator and the loads of the previous frame for the plurality of display blocks for the each colors from the load storer and to determine whether the image is the static image or not based on the differences between the loads of the previous frame for the plurality of display blocks for the each colors and the loads of the present frame for the plurality of display blocks for the each colors.

In an embodiment, the driving controller may further include an image compensator configured to receive a flag signal indicating the image as the static image from the static image determiner and to reduce the luminance when the image is determined as the static image.

In an embodiment of a method of driving a display panel according to the present inventive concept, the method includes calculating differences between loads of a previous frame and loads of a present frame for display blocks for each colors in the display panel, determining whether an image is a static image or not based on the differences between the loads of the previous frame and the loads of the present frame for the plurality of display blocks for the each colors, reducing luminance of the image when the image is determined as the static image to generate compensated image data and generating data voltages based on the compensated image data and outputting the data voltages to the display panel.

In an embodiment, the determining whether the image is a static image or not may include determining a maximum value among absolute values of the differences between the loads of the previous frame and the loads of the present frame for the plurality of display blocks for the each colors.

In an embodiment, the determining whether the image is a static image or not may further include generating a sensitivity value by normalizing the maximum value to a ratio of a difference between a maximum load and a minimum load.

In an embodiment, the determining whether the image is a static image or not may further include determining data of the present frame as static image data when the sensitivity value is less than a first threshold value.

In an embodiment, the reducing luminance of the image when the imaged is determined as the static image may include reducing the luminance of the image when a maintaining time of the static image is greater than a second threshold value.

In an embodiment of a display apparatus according to the present inventive concept, the display apparatus includes a display panel, a data driver and a driving controller. The display panel includes a plurality of display blocks. The data driver is configured to output data voltages to the display panel. The driving controller is configured to control the data driver. The driving controller is configured to calculate differences between currents or luminances of a previous frame and currents or luminances of a present frame for the plurality of display blocks for each colors, to determine whether an image is a static image or not based on the differences between the currents or luminances of the previous frame and the currents or luminances of the present frame for the plurality of display blocks for the each colors, and to reduce luminance of the image when the image is determined as the static image.

In an embodiment, the driving controller may be configured to determine a maximum value among absolute values of the differences between the currents or luminances of the previous frame and the currents or luminances of the present frame for the plurality of display blocks for the each colors.

In an embodiment, the driving controller may be configured to generate a sensitivity value by normalizing the maximum value to a ratio of a difference between a maximum current or luminance and a minimum current or luminance.

In an embodiment, when the sensitivity value is less than a first threshold value, the driving controller may be configured to determine data of the present frame as static image data.

In an embodiment, the driving controller may include a current calculator configured to calculate the currents of the previous frame and the currents of the present frame for the plurality of display blocks for the each colors, a current storer configured to store the currents of the previous frame for the plurality of display blocks for the each colors and a static image determiner configured to receive the currents of the present frame for the plurality of display blocks for the each colors from the current calculator and the currents of the previous frame for the plurality of display blocks for the each colors from the current storer and to determine the image as the static image based on the differences between the currents of the previous frame for the plurality of display blocks for the each colors and the currents of the present frame for the plurality of display blocks for the each colors.

In an embodiment, the driving controller may include a luminance calculator configured to calculate the luminances of the previous frame and the luminances of the present frame for the plurality of display blocks for the each colors, a luminance storer configured to store the luminances of the previous frame for the plurality of display blocks for the each colors and a static image determiner configured to receive the luminances of the present frame for the plurality of display blocks for the each colors from the luminance calculator and the luminances of the previous frame for the plurality of display blocks for the each colors from the luminance storer and to determine the image as the static image based on the differences between the luminances of the previous frame for the plurality of display blocks for the each colors and the luminances of the present frame for the plurality of display blocks for the each colors.

In an embodiment of an electronic apparatus according to the present inventive concept, the electronic apparatus includes a display panel, a data driver, a driving controller and a processor. The display panel includes a plurality of display blocks. The data driver is configured to output data voltages to the display panel. The driving controller is configured to control the data driver. The processor is configured to output input image data and an input control signal to the driving controller. The driving controller is configured to calculate differences between loads of a previous frame and loads of a present frame for the plurality of display blocks for each colors, to determine whether an image is a static image or not based on the differences between the loads of the previous frame and the loads of the present frame for the plurality of display blocks for the each colors, and to reduce luminance of the image when the image is determined as the static image.

According to the display apparatus, the method of driving the display panel using the display apparatus and the electronic apparatus including the display apparatus, the image is determined as the static image based on the differences between the loads of the previous frame and the loads of the present frame for the display blocks for the each colors of the display panel to enhance an accuracy of the determination of the static image.

Alternatively, the image is determined as the static image based on the differences between the currents of the previous frame and the currents of the present frame for the display blocks for the each colors of the display panel to enhance an accuracy of the determination of the static image.

Alternatively, the image is determined as the static image based on the differences between the luminances of the previous frame and the luminances of the present frame for the display blocks for the each colors of the display panel to enhance an accuracy of the determination of the static image.

Accordingly, an error mistakenly determining a moving image with little movements between frames and a moving image which is dark overall as a static image may be prevented.

Therefore, when the same image is displayed on the display panel for a long time, the luminance of the display image may be reduced so that the afterimage of the display panel may be prevented and the power consumption of the display apparatus may be reduced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
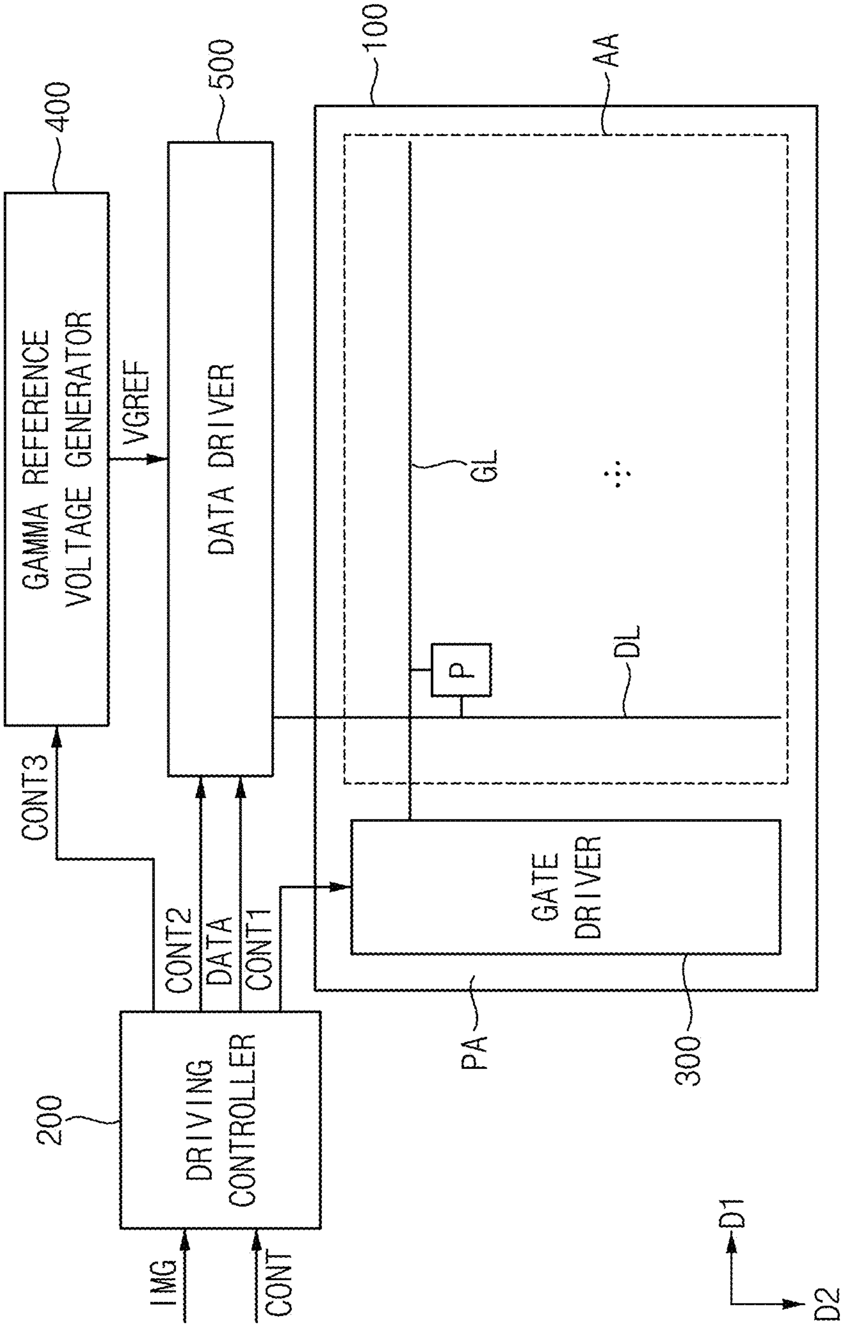
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver drives the display panel 100. The display panel driver includes a driving controller 200, a gate driver 300, a gamma reference voltage generator 400 and a data driver 500.

For example, the driving controller 200 and the data driver 500 may be integrally formed. The driving controller 200, the gamma reference voltage generator 400 and the data driver 500 may be integrally formed. A driving module in which at least the driving controller 200 and the data driver 500 are integrated may be a timing controller embedded data driver (TED).

The display panel 100 has a display region AA on which an image is displayed and a peripheral region PA disposed adjacent to the display region AA.

The display panel 100 includes a plurality of gate lines GL, a plurality of data lines DL and a plurality of pixels P connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus (e.g., an application processor). For example, the input image data IMG may include red image data, green image data and blue image data. For example, the input image data IMG may include white image data. For example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region PA of the display panel 100. For example, the gate driver 300 may be integrated on the peripheral region PA of the display panel 100.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
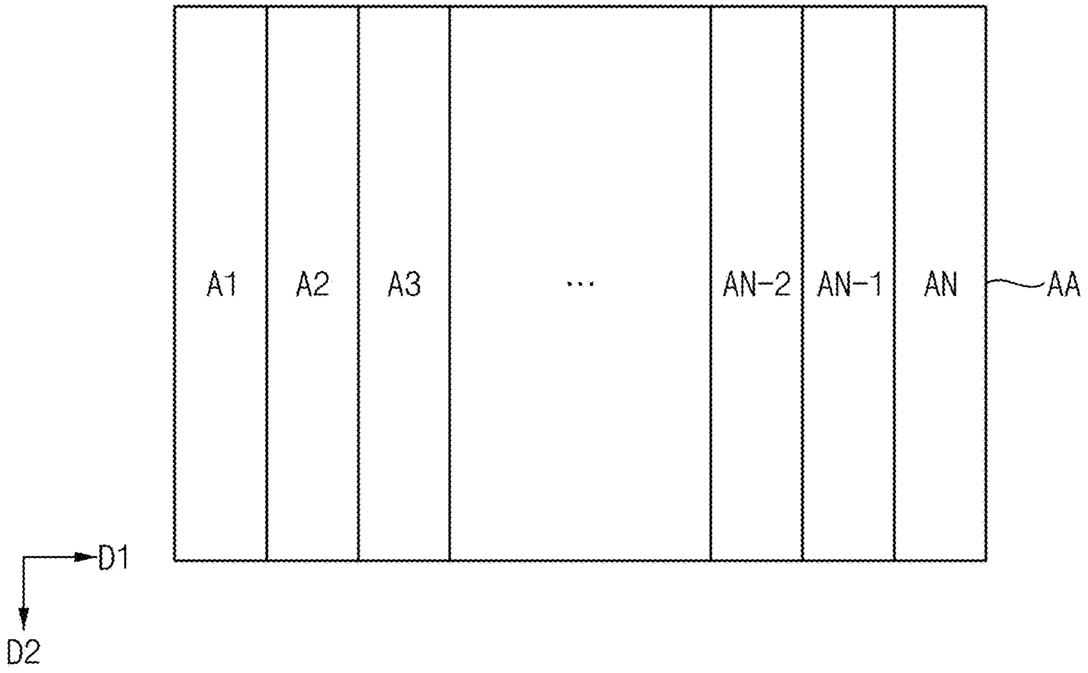
FIG. 2 is a diagram illustrating an example of display blocks of a display panel of FIG. 1.

FIG. 2 is a diagram illustrating an example of display blocks of the display panel 100 of FIG. 1.

Referring to FIGS. 1 and 2, the display panel 100 may include a plurality of display blocks.

For example, each of the display blocks may extend in the second direction D2. Each of the display blocks may be a rectangular shape having a shorter side extending in the first direction D1 and a longer side extending in the second direction D2. The display blocks may be disposed in the first direction D1.

In FIG. 2, the display panel 100 may include a first display block A1, a second display block A2, a third display block A3, . . . , an N−2-th display block AN-2, an N−1-th display block AN-1 and an N-th display block AN. For example, a number of the display blocks may be equal to or greater than ten. For example, the number of the display blocks may be sixteen.

Figure 3:
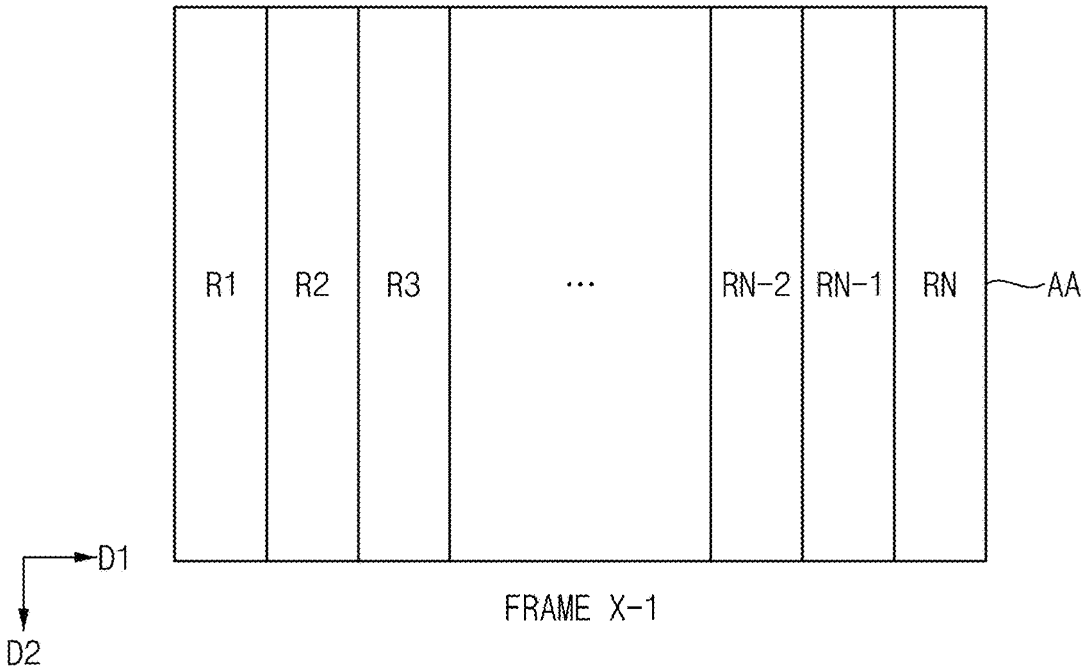
FIG. 3 is a diagram illustrating first color image data of an X−1-th frame for the display blocks of the display panel of FIG. 1.
Figure 4:
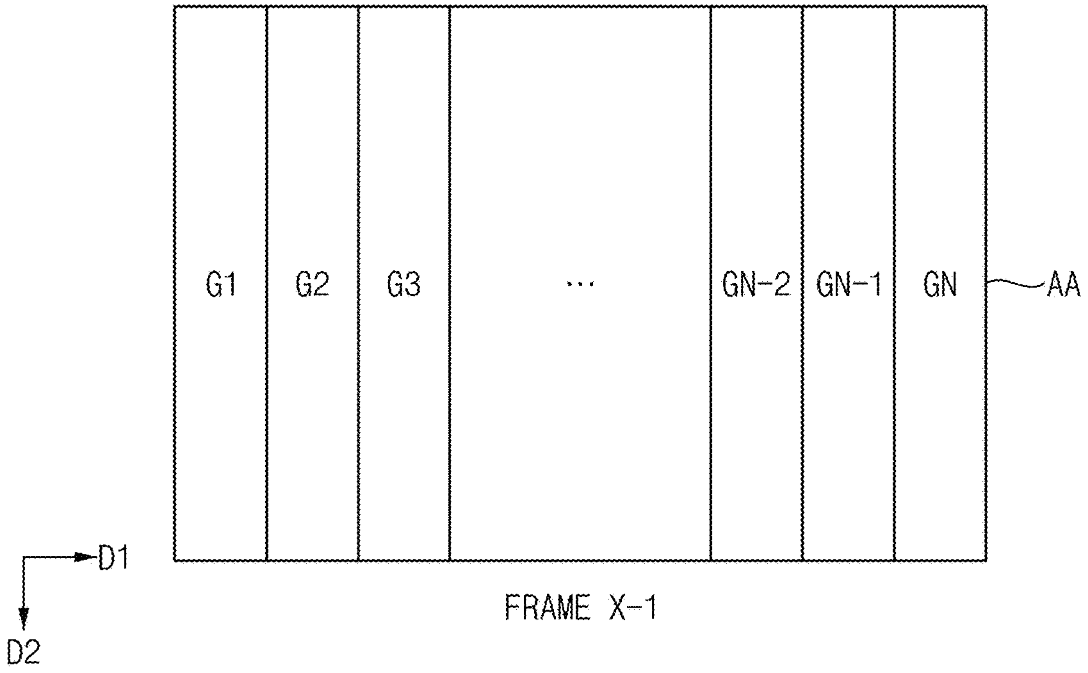
FIG. 4 is a diagram illustrating second color image data of the X−1-th frame for the display blocks of the display panel of FIG. 1.
Figure 5:
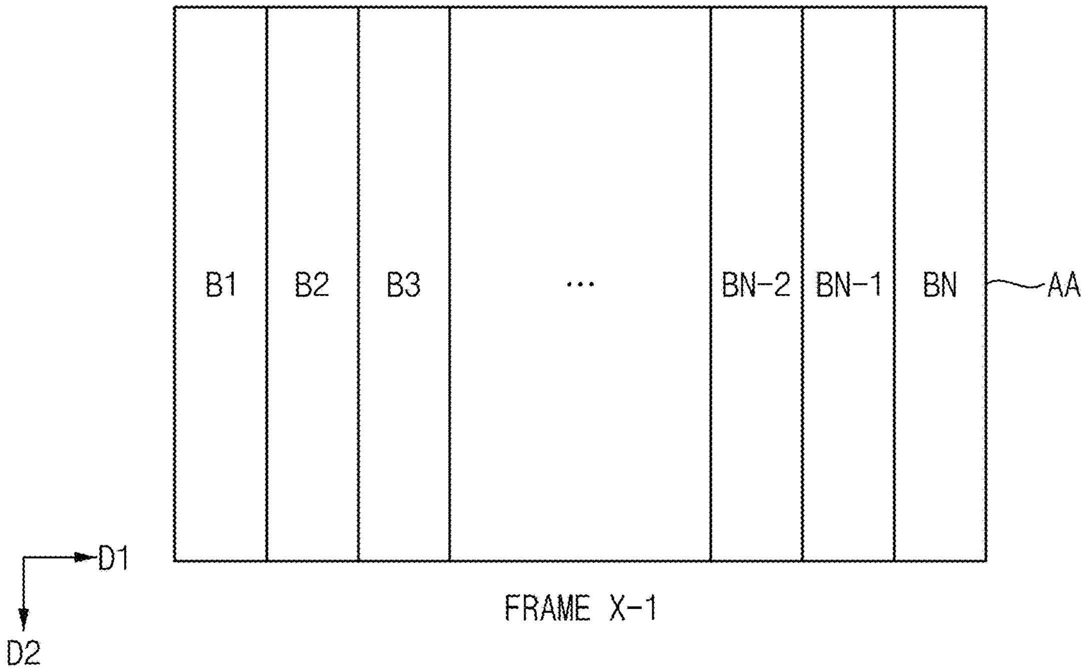
FIG. 5 is a diagram illustrating third color image data of the X−1-th frame for the display blocks of the display panel of FIG. 1.
Figure 6:
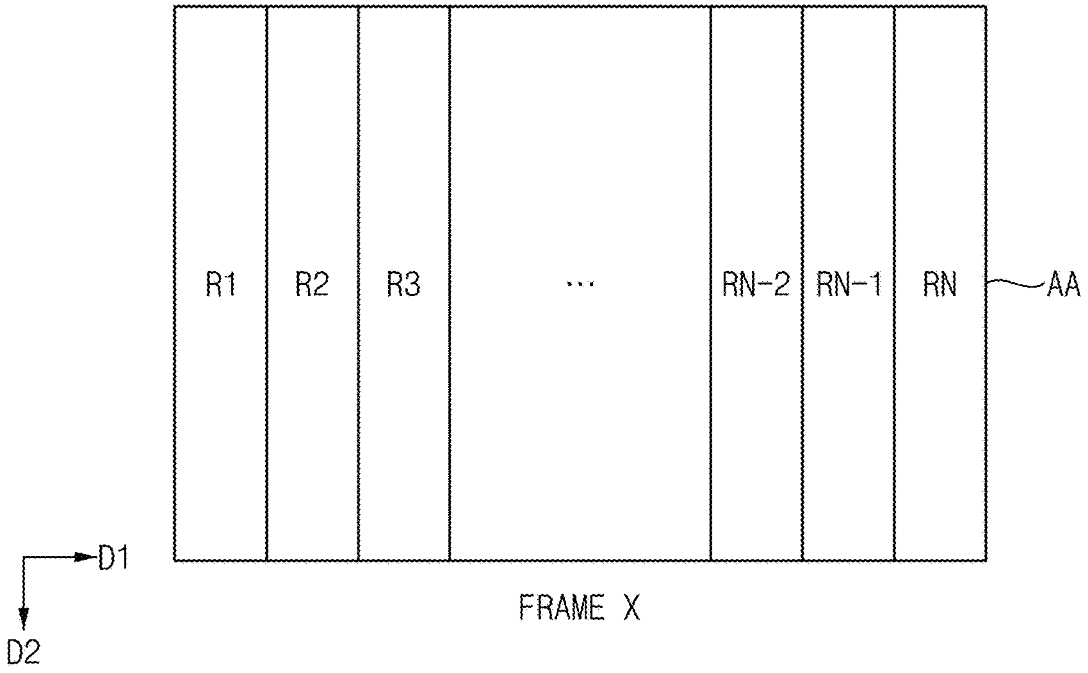
FIG. 6 is a diagram illustrating first color image data of an X-th frame for the display blocks of the display panel of FIG. 1.
Figure 7:
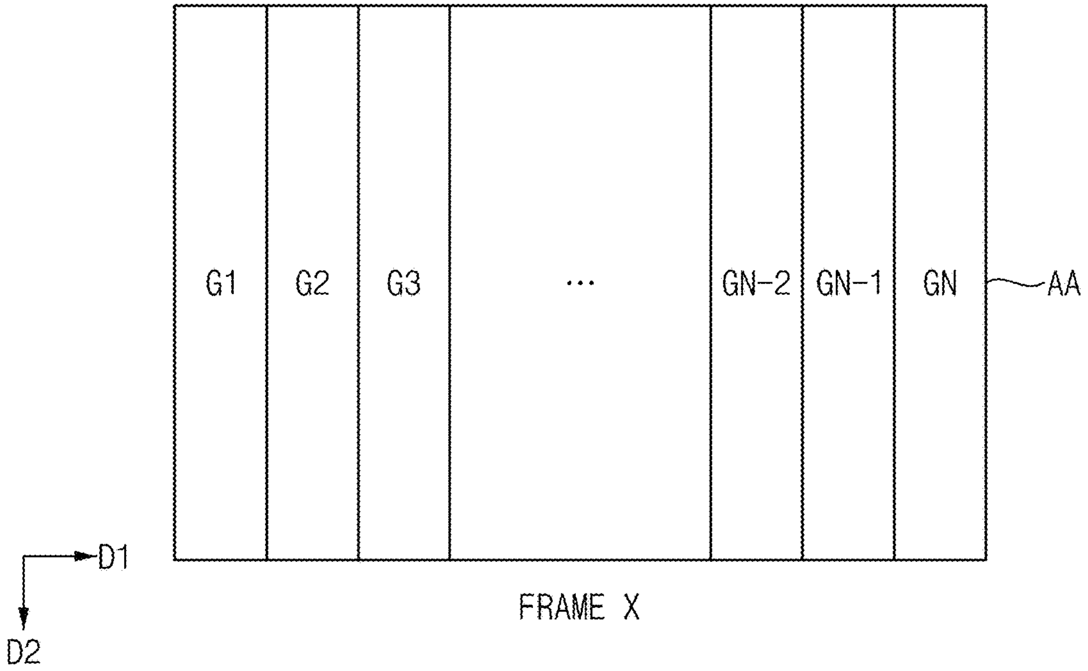
FIG. 7 is a diagram illustrating second color image data of the X-th frame for the display blocks of the display panel of FIG. 1.
Figure 8:
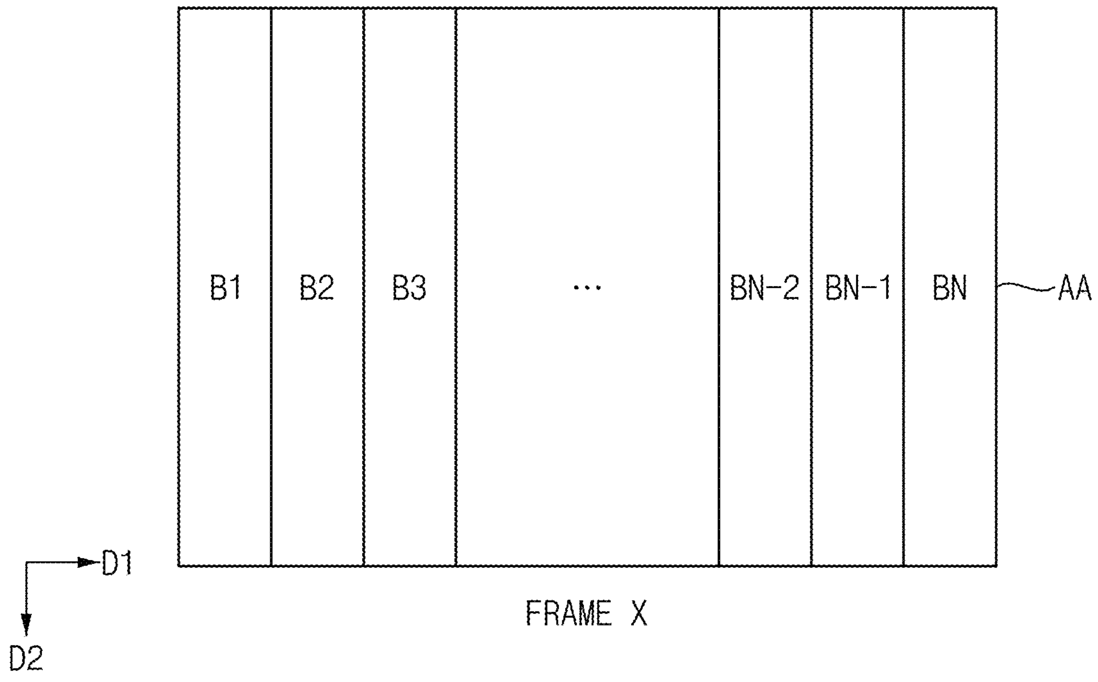
FIG. 8 is a diagram illustrating third color image data of the X-th frame for the display blocks of the display panel of FIG. 1.

FIG. 3 is a diagram illustrating first color image data of an X−1-th frame FRAME X−1 for the display blocks of the display panel 100 of FIG. 1. FIG. 4 is a diagram illustrating second color image data of the X−1-th frame FRAME X−1 for the display blocks of the display panel 100 of FIG. 1. FIG. 5 is a diagram illustrating third color image data of the X−1-th frame FRAME X−1 for the display blocks of the display panel 100 of FIG. 1. FIG. 6 is a diagram illustrating first color image data of an X-th frame FRAME X for the display blocks of the display panel 100 of FIG. 1. FIG. 7 is a diagram illustrating second color image data of the X-th frame FRAME X for the display blocks of the display panel 100 of FIG. 1. FIG. 8 is a diagram illustrating third color image data of the X-th frame FRAME X for the display blocks of the display panel 100 of FIG. 1.

Referring to FIGS. 1 to 8, for example, the first color image data may be red image data. For example, the second color image data may be green image data. For example, the third color image data may be blue image data.

As shown in FIG. 3, the first color image data of the X−1-th frame FRAME X−1 may include first block red data R1, second block red data R2, third block red data R3, . . . , N−2-th block red data RN-2, N−1-th block red data RN-1 and N-th block red data RN.

As shown in FIG. 4, the second color image data of the X−1-th frame FRAME X−1 may include first block green data G1, second block green data G2, third block green data G3, . . . , N−2-th block green data GN-2, N−1-th block green data GN-1 and N-th block green data GN.

As shown in FIG. 5, the third color image data of the X−1-th frame FRAME X−1 may include first block blue data B1, second block blue data B2, third block blue data B3, . . . , N−2-th block blue data BN-2, N−1-th block blue data BN-1 and N-th block blue data BN.

As shown in FIG. 6, the first color image data of the X-th frame FRAME X may include first block red data R1, second block red data R2, third block red data R3, . . . , N−2-th block red data RN-2, N−1-th block red data RN-1 and N-th block red data RN.

As shown in FIG. 7, the second color image data of the X-th frame FRAME X may include first block green data G1, second block green data G2, third block green data G3, . . . , N−2-th block green data GN-2, N−1-th block green data GN-1 and N-th block green data GN.

As shown in FIG. 8, the third color image data of the X-th frame FRAME X may include first block blue data B1, second block blue data B2, third block blue data B3, . . . , N−2-th block blue data BN-2, N−1-th block blue data BN-1 and N-th block blue data BN.

Figure 9:
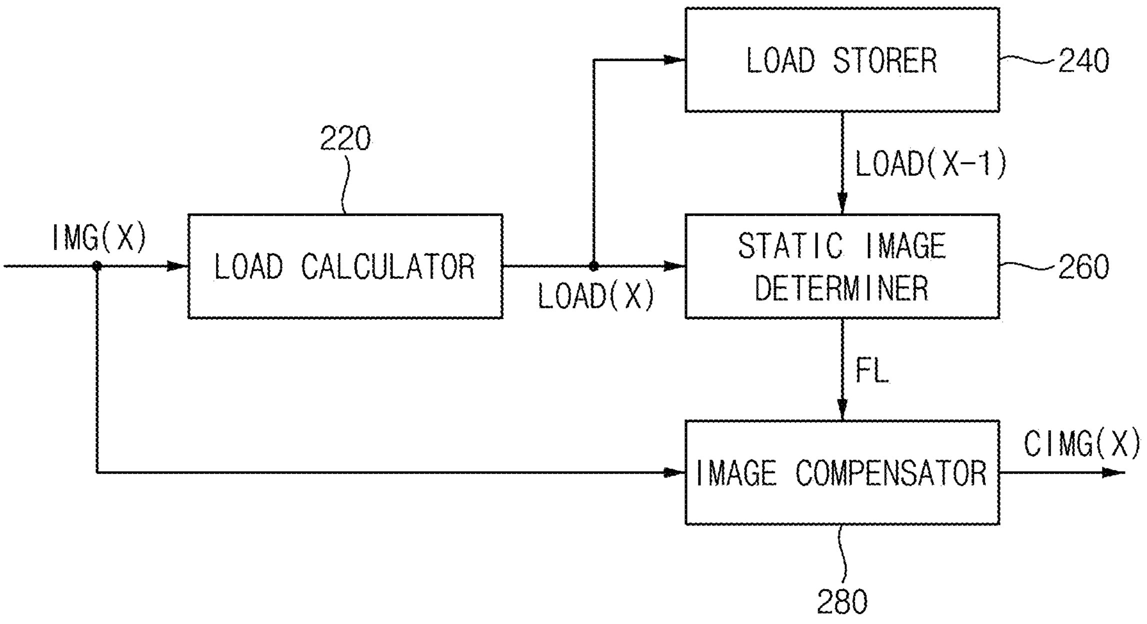
FIG. 9 is a block diagram illustrating a driving controller of FIG. 1.
Figure 10:
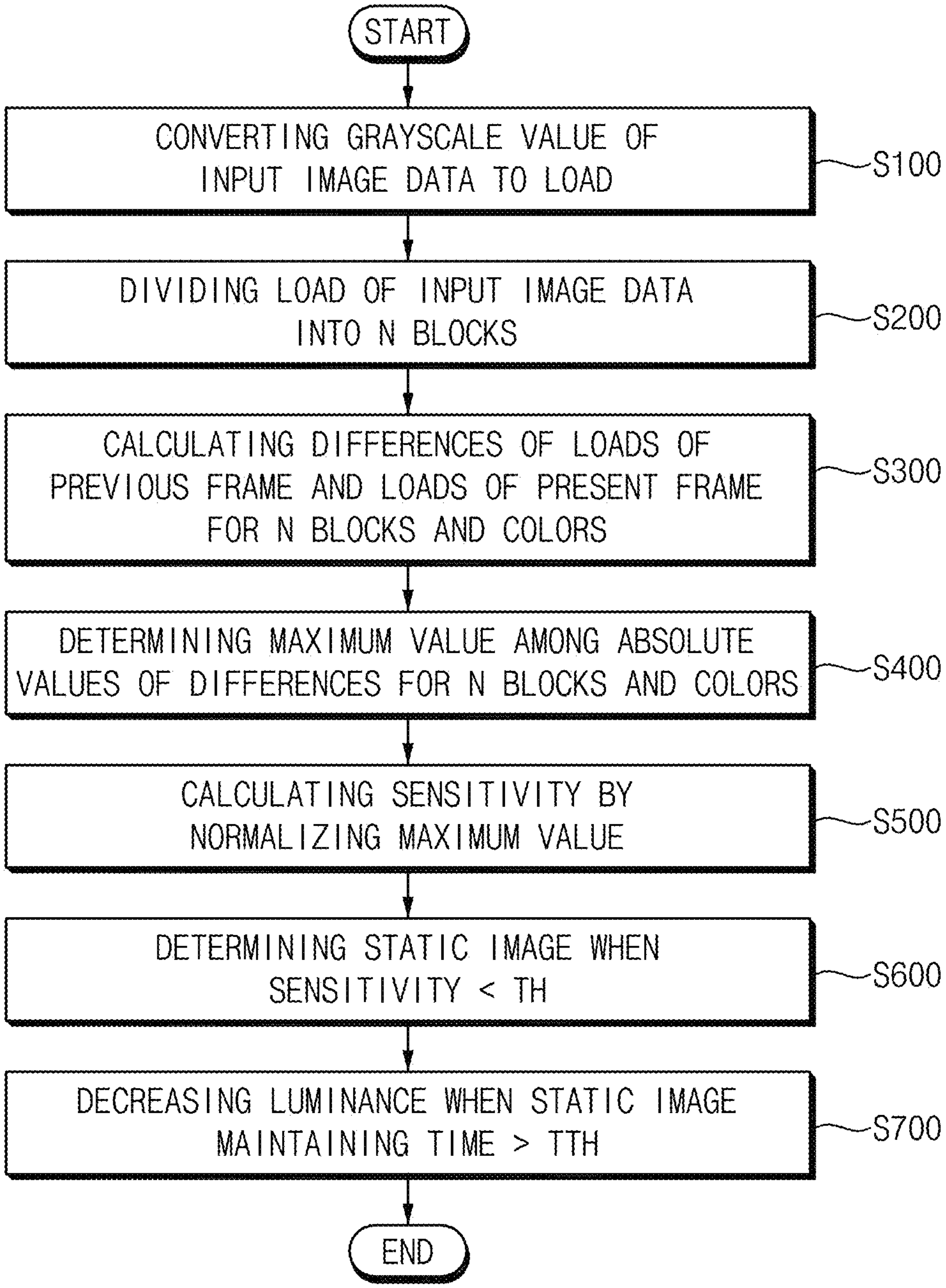
FIG. 10 is a flowchart diagram illustrating an operation of the driving controller of FIG. 1.

FIG. 9 is a block diagram illustrating the driving controller 200 of FIG. 1. FIG. 10 is a flowchart diagram illustrating an operation of the driving controller 200 of FIG. 1.

Referring to FIGS. 1 to 10, the display apparatus includes the display panel 100, the data driver 500 and the driving controller 200.

The driving controller 200 controls the data driver 500. The driving controller 200 may calculate differences between loads LOAD(X−1) of the previous frame and loads LOAD(X) of the present frame for the display blocks for each colors. The driving controller 200 may determine a static image based on the differences between the loads LOAD(X−1) of the previous frame and the loads LOAD(X) of the present frame for the display blocks for the each colors. The driving controller 200 may reduce a luminance for the static image.

For example, the driving controller 200 may determine a maximum value among absolute values of the differences between the loads LOAD(X−1) of the previous frame and the loads LOAD(X) of the present frame for the display blocks for the each colors.

Herein, when the load of the X−1-th frame of the first color in the first display block is LOAD(X−1, R1), the load of the X-th frame of the first color in the first display block is LOAD(X, R1), the load of the X−1-th frame of the first color in the second display block is LOAD(X−1, R2), the load of the X-th frame of the first color in the second display block is LOAD(X, R2), the load of the X−1-th frame of the first color in the N-th display block is LOAD(X−1, RN), the load of the X-th frame of the first color in the N-th display block is LOAD(X, RN), the load of the X−1-th frame of the second color in the first display block is LOAD(X−1, G1), the load of the X-th frame of the second color in the first display block is LOAD(X, G1), the load of the X−1-th frame of the second color in the second display block is LOAD (X−1, G2), the load of the X-th frame of the second color in the second display block is LOAD(X, G2), the load of the X−1-th frame of the second color in the N-th display block is LOAD(X−1, GN), the load of the X-th frame of the second color in the N-th display block is LOAD(X, GN), the load of the X−1-th frame of the third color in the first display block is LOAD(X−1, B1), the load of the X-th frame of the third color in the first display block is LOAD(X, B1), the load of the X−1-th frame of the third color in the second display block is LOAD(X−1, B2), the load of the X-th frame of the third color in the second display block is LOAD(X, B2), the load of the X−1-th frame of the third color in the N-th display block is LOAD(X−1, BN), the load of the X-th frame of the third color in the N-th display block is LOAD (X, BN), the maximum value may be MAX(|LOAD(X−1, R1)−LOAD(X, R1)|, |LOAD(X−1, R2)−LOAD(X, R2)|, . . . , |LOAD(X−1, RN)−LOAD(X, RN)|, |LOAD(X−1, G1)−LOAD(X, G1)|, |LOAD(X−1, G2)−LOAD(X, G2)|, . . . , |LOAD(X−1, GN)−LOAD(X, GN)|, |LOAD(X−1, B1)−LOAD(X, B1)|, |LOAD(X−1, B2)−LOAD(X, B2)|, . . . , |LOAD(X−1, BN)−LOAD(X, BN)|).

The driving controller 200 may generate a sensitivity value by normalizing the maximum value to a ratio of a difference between a maximum load and a minimum load. The maximum value is a maximum absolute value among the absolute values of the differences between the loads LOAD(X−1) of the previous frame and the loads LOAD(X) of the present frame. When the maximum value is normalized by the ratio of the difference between the maximum load and the minimum load, the difference between the load LOAD(X−1) of the previous frame and the load LOAD(X) of the present frame is not an absolute value but a relative value with respect to the difference between the maximum load and the minimum load.

When the sensitivity value is Δ, an absolute value of the difference between the load of the X−1-th frame of the first color in the first display block and the load of the X-th frame of the first color in the first display block is D(R1), an absolute value of the difference between the load of the X−1-th frame of the first color in the second display block and the load of the X-th frame of the first color in the second display block is D(R2), an absolute value of the difference between the load of the X−1-th frame of the first color in the N-th display block and the load of the X-th frame of the first color in the N-th display block is D(RN), an absolute value of the difference between the load of the X−1-th frame of the second color in the first display block and the load of the X-th frame of the second color in the first display block is D(G1), an absolute value of the difference between the load of the X−1-th frame of the second color in the second display block and the load of the X-th frame of the second color in the second display block is D(G2), an absolute value of the difference between the load of the X−1-th frame of the second color in the N-th display block and the load of the X-th frame of the second color in the N-th display block is D(GN), an absolute value of the difference between the load of the X−1-th frame of the third color in the first display block and the load of the X-th frame of the third color in the first display block is D(B1), an absolute value of the difference between the load of the X−1-th frame of the third color in the second display block and the load of the X-th frame of the third color in the second display block is D(B2), an absolute value of the difference between the load of the X−1-th frame of the third color in the N-th display block and the load of the X-th frame of the third color in the N-th display block is D(BN), the maximum load is MAXLO, the minimum load is MINLO and the number of the display blocks of the display panel is N, $$\Delta = \frac{\text{MAX}(D(R1), D(R2), \ldots, D(RN), D(G1), D(G2), \ldots, D(GN), D(B1), D(B2), \ldots, D(BN))}{(MAXLO - MINLO)/(N \times 3)}$$

may be satisfied.

Herein, D(R1)=|LOAD(X−1, R1)−LOAD(X, R1)|, D(R2)=|LOAD(X−1, R2)−LOAD(X, R2)|, D(RN)=|LOAD(X−1, RN)−LOAD(X, RN)|, D(G1)=|LOAD(X−1, G1)−LOAD(X, G1)|, D(G2)=|LOAD(X−1, G2)−LOAD(X, G2)|, D(GN)=|LOAD(X−1, GN)−LOAD(X, GN)|, D(B1)=|LOAD(X−1, B1)−LOAD(X, B1)|, D(B2)=|LOAD(X−1, B2)−LOAD(X, B2)|, D(BN)=|LOAD(X−1, BN)−LOAD(X, BN)|.

Herein, the maximum load MAXLO and the minimum load MINLO may be values for the entire display panel 100, not for each display block. In addition, the maximum load MAXLO and the minimum load MINLO may be values for all colors, not for each color.

The maximum value MAX(D(R1),D(R1), . . . , D(RN), D(G1),D(G2), . . . , D(GN),D(B1),D(B2), . . . , D(BN)) disposed in a numerator when calculating the sensitivity value Δ is the load difference corresponding to one display block and one color so that the difference between the maximum load MAXLO and the minimum load MINLO in a denominator may be divided by (N×3), where "N" is the number of the display blocks of the display panel 100 and "3" is the number of colors of the input image data IMG.

When the sensitivity value Δ is less than a first threshold value TH, the driving controller 200 may determine data IMG(X) of the present frame as static image data.

When a maintaining time of the static image is greater than a second threshold value TTH, the driving controller 200 may reduce the luminance for the static image.

Referring to FIG. 9, the driving controller 200 may include a load calculator 220 calculating the loads LOAD (X−1) of the previous frame and the loads LOAD(X) of the present frame for the display blocks for the each colors, a load storer 240 storing the loads LOAD(X−1) of the previous frame for the display blocks for the each colors and a static image determiner 260 receiving the loads LOAD(X) of the present frame for the display blocks for the each colors from the load calculator 220 and the loads LOAD (X−1) of the previous frame for the display blocks for the each colors from the load storer 240 and determining whether the image is a static image or not based on the differences between the loads LOAD(X−1) of the previous frame for the display blocks for the each colors and the loads LOAD(X) of the present frame for the display blocks for the each colors.

The driving controller 200 may further include an image compensator 280 receiving a flag signal FL indicating the static image from the static image determiner 260 and reducing the luminance for the input image data IMG(X).

Referring to FIG. 10, in a method of driving the display panel 100 according to the present embodiment, the driving controller 200 may convert the grayscale value of the input image data IMG to the load (operation S100). For example, the driving controller 200 may convert the grayscale value of the input image data IMG to the load by a gamma conversion. The load of the input image data IMG corresponds to a luminance actually perceived by a user's eyes. Accordingly, when the image displayed on the display panel is determined as the static image using the load of the input image data IMG, the accuracy of the determination of the static image may be enhanced compared to a case in which the static image is determined using the grayscale value of the input image data IMG.

The driving controller 200 may divide the load of the input image data IMG into N blocks (operation S200).

The driving controller 200 may calculate the difference between the loads LOAD(X−1) of the previous frame and the loads LOAD(X) of the present frame for the N blocks for each colors (operation S300).

When calculating one load value for each display block for one color in each frame, the load values of all pixels of the one color in each display block may be added up. When calculating one load value for each display block for the one color in each frame, one frame data may only occupy a memory space equal to a multiplication of the number of the display blocks by the number of colors. For example, when the number of the display blocks is N and the number of colors is three, the loads LOAD(X−1) of the previous frame may have 3N values and the loads LOAD(X) of the present frame may have 3N values. The load storer 240 may require only space to store 3N values.

Humans have two eyes in a horizontal direction so that humans are more sensitive to image movement in the horizontal direction than in a vertical direction. Thus, the display block has a rectangular shape extending in the vertical direction (e.g., the second direction D2).

The driving controller 200 may determine the maximum value among the absolute values of the differences between the loads LOAD(X−1) of the previous frame and the loads LOAD(X) of the present frame for the display blocks for the each colors (operation S400).

The driving controller 200 may calculate the sensitivity value Δ by normalizing the maximum value to a ratio of the difference between the maximum load and the minimum load (operation S500).

When the sensitivity value is less than the first threshold value TH, the driving controller 200 may determine the data IMG(X) of the present frame as the static image data (operation S600).

When the maintaining time of the static image is greater than the second threshold value TTH, the driving controller 200 may reduce the luminance for the static image (operation S700). If the luminance is reduced as soon as the image is determined as the static image, the luminance decrease may be applied instantly and also be released instantly so that the luminance decrease may be easily recognized to a user's eyes. When the luminance decrease is easily recognized to the user's eyes, the user may feel uncomfortable when using the display apparatus. Thus, the driving controller 200 may reduce the luminance when the maintaining time of the static image is greater than the second threshold value TTH. In addition, the luminance may be gradually reduced over a long period of time to ensure that the luminance decreases is not easily recognized to the user's eyes. The driving controller 200 may reduce the luminance for the static image to generate compensated image data CIMG(X). The data driver 500 may generate the data voltage based on the compensated image data CIMG(X) and output the data voltage to the display panel 100.

Figure 11:
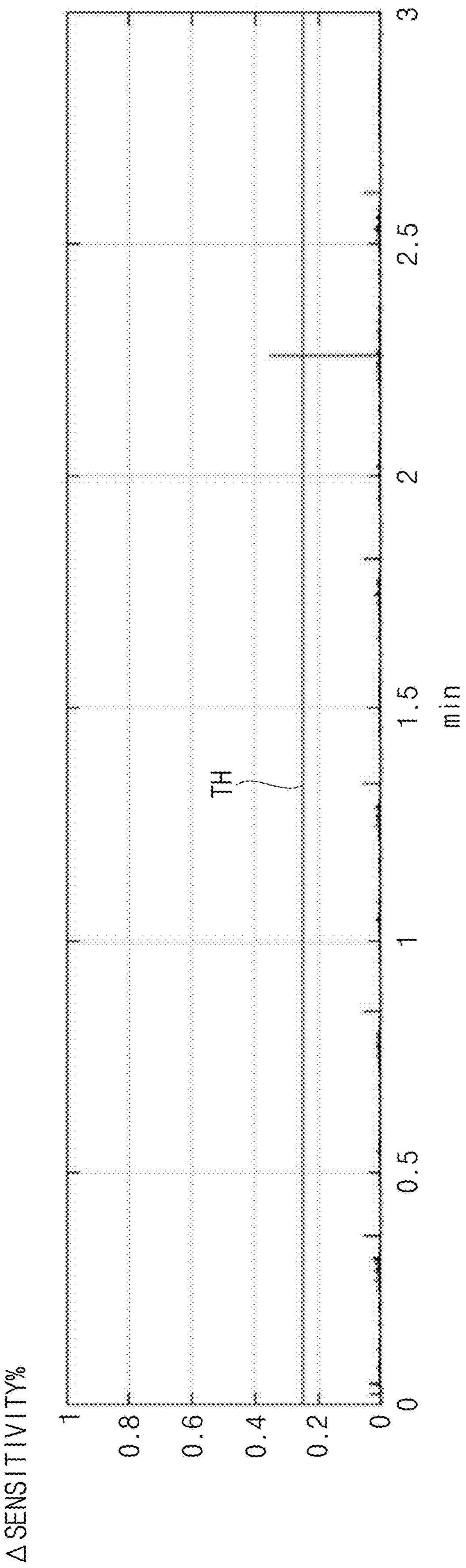
FIG. 11 is a graph illustrating an example of a determination of a static image according to a comparative embodiment.
Figure 12:
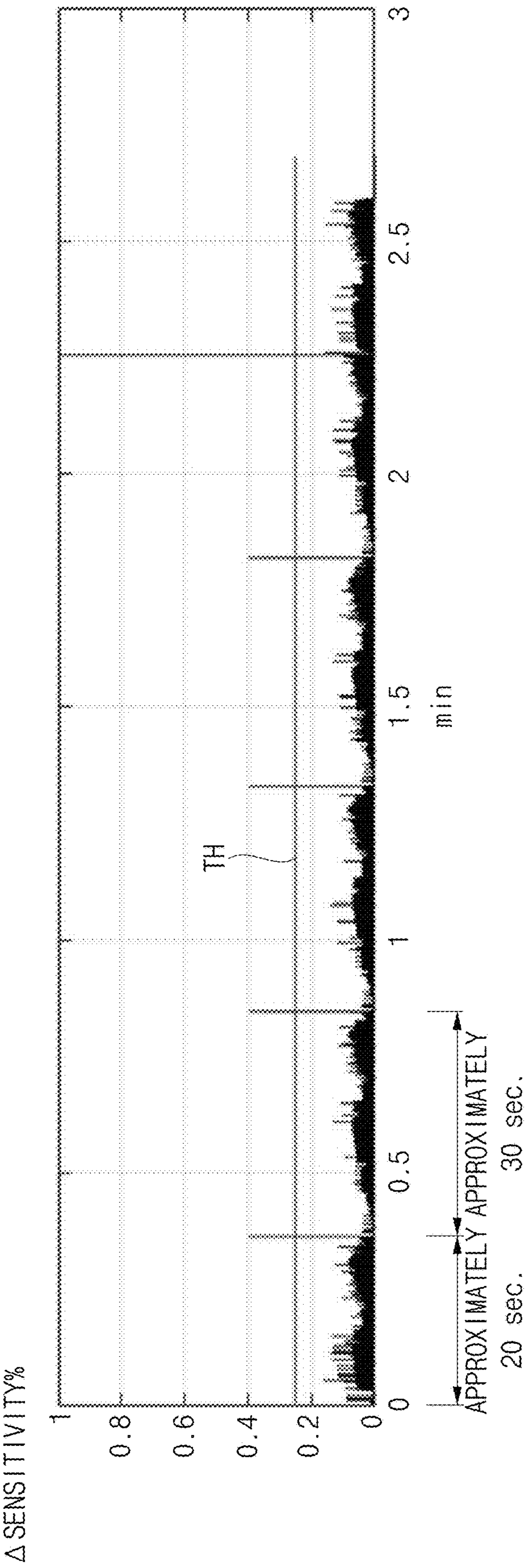
FIG. 12 is a graph illustrating an example of a determination of a static image according to the present embodiment.

FIG. 11 is a graph illustrating an example of a determination of a static image according to a comparative embodiment. FIG. 12 is a graph illustrating an example of a determination of a static image according to the present embodiment.

In FIGS. 11 and 12, the determination of the static image according to the comparative embodiment and the determination of the static image according to the present embodiment are compared for the same image. FIGS. 11 and 12 represent a case in which a moving image with little movements between frames is displayed on the display panel.

In the comparative embodiment, the static image may be determined based on the difference between the load of the previous frame of the entire display panel and all colors, and the load of the present frame of the entire display panel and the all colors. In the present embodiment, the static image may be determined based on the differences between the loads of the previous frame and the loads of the present frame for the display blocks for the each colors.

In the comparative embodiment, the moving image with little movements between frames may be mistakenly determined by the static image. When the moving image is displayed on the display panel as disclosed in FIG. 11, only once, for example, after 2 minutes of a 3-minute playback time, the image displayed on the display panel is determined as the moving image.

On the other hand, in the present embodiment, the static image is determined using the absolute value of the difference between the loads of the previous frame and the loads of the present frame for the display blocks for the each colors so that the image displayed on the display panel is determined as a moving image once after approximately 20 seconds and once again approximately 30 seconds later, moving image is determined at approximately 20 to 30 seconds intervals.

Figure 13:
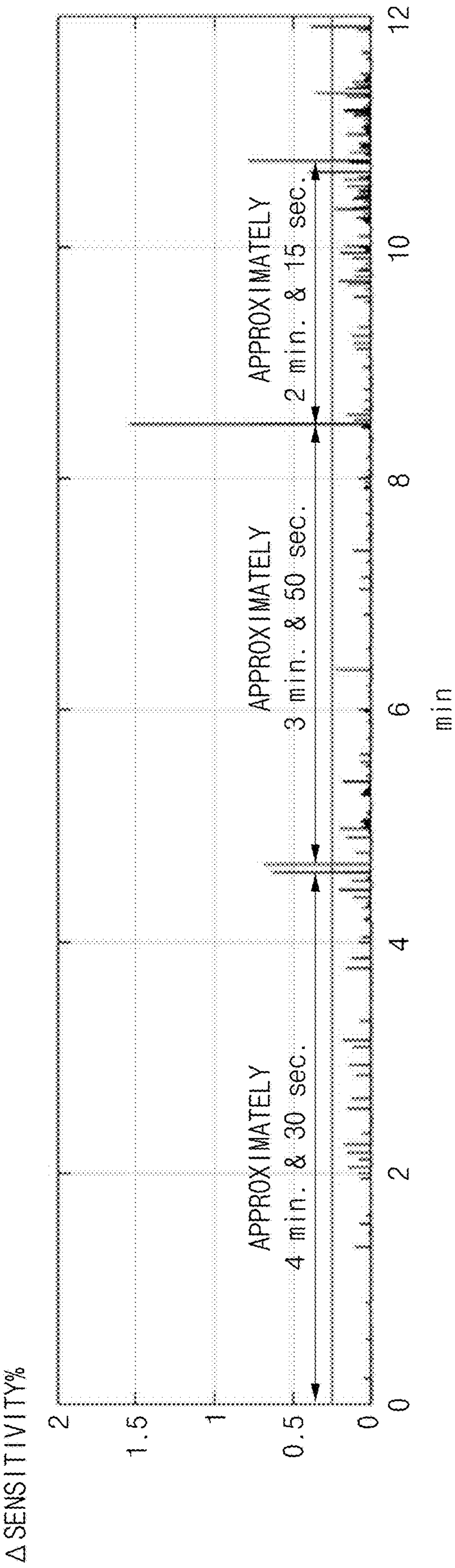
FIG. 13 is a graph illustrating an example of a determination of a static image according to a comparative embodiment.
Figure 14:
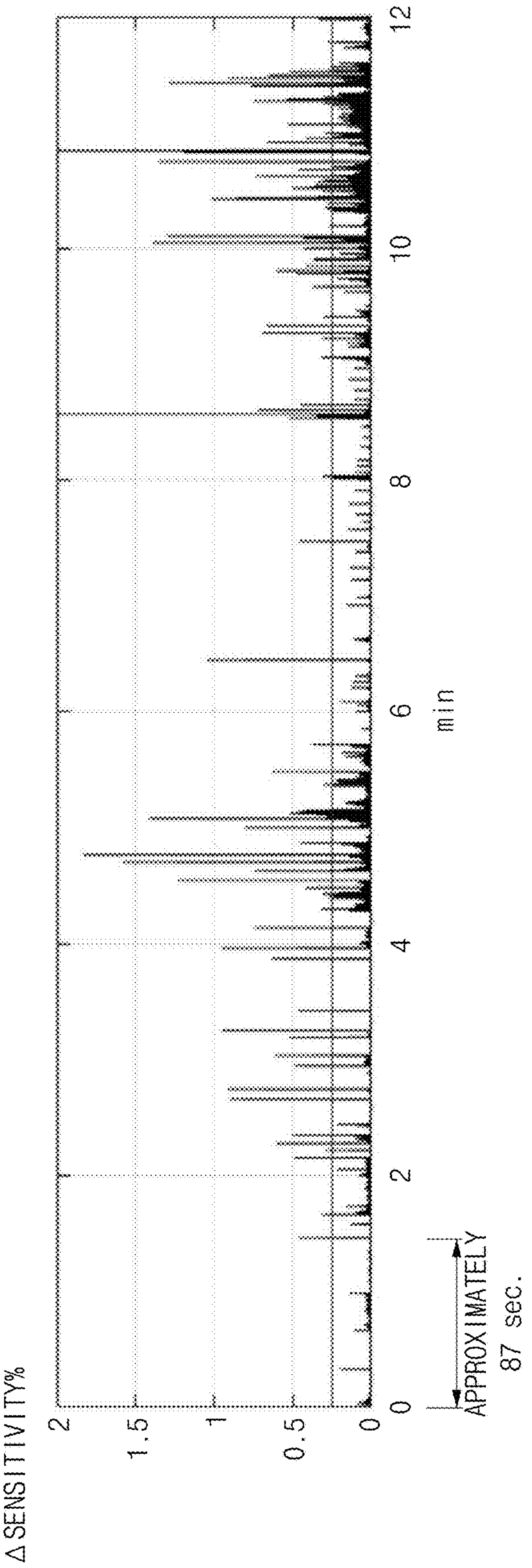
FIG. 14 is a graph illustrating an example of a determination of a static image according to the present embodiment.

FIG. 13 is a graph illustrating an example of a determination of a static image according to a comparative embodiment. FIG. 14 is a graph illustrating an example of a determination of a static image according to the present embodiment.

In FIGS. 13 and 14, the determination of the static image according to the comparative embodiment and the determination of the static image according to the present embodiment are compared for the same image. FIGS. 13 and 14 represent a case in which a moving image which is dark overall is displayed on the display panel.

In the comparative embodiment, the moving image which is dark overall may be mistakenly determined as the static image. Although only the moving image is displayed on the display panel in FIG. 13, a moving image is determined once after approximately 4 minutes and 30 seconds, once again approximately 3 minutes and 50 seconds later and once again approximately 2 minutes and 15 seconds in a 12-minute playback time.

On the other hand, in the present embodiment, the static image is determined using the absolute value of the difference between the loads of the previous frame and the loads of the present frame for the display blocks for the each colors so that a moving image may be determined in much shorter intervals.

According to the present embodiment, the static image may be determined based on the differences between the loads LOAD(X−1) of the previous frame and the loads LOAD(X) of the present frame for the display blocks for the each colors to enhance an accuracy of the determination of the static image.

Accordingly, an error mistakenly determining a moving image with little movements between frames and a moving image which is dark overall as a static image may be prevented.

Therefore, when the same image is displayed on the display panel for a long time, the luminance of the display image may decrease so that the afterimage of the display panel 100 may be prevented and the power consumption of the display apparatus may be reduced.

Figure 15:
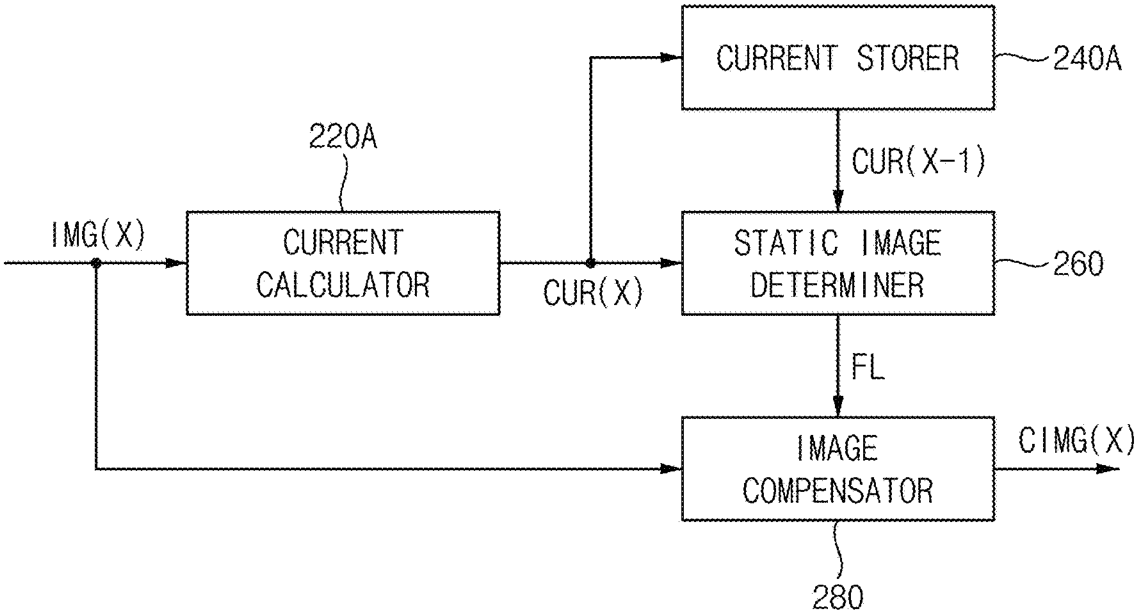
FIG. 15 is a block diagram illustrating a driving controller of a display apparatus according to an embodiment of the present inventive concept.

FIG. 15 is a block diagram illustrating a driving controller 200 of a display apparatus according to an embodiment of the present inventive concept.

The display apparatus according to the present embodiment is substantially the same as the display apparatus of the previous embodiment explained referring to FIGS. 1 to 14 except that the driving controller determines the static image not based on the loads of the frames but based on currents of the frames. Thus, the same reference numerals will be used to refer to the same or like parts as those described in the previous embodiment of FIGS. 1 to 14 and any repetitive explanation concerning the above elements will be omitted.

Referring to FIGS. 1 to 8 and 10 to 15, the driving controller 200 may include a current calculator 220A calculating currents CUR(X−1) of the previous frame and currents CUR(X) of the present frame for the display blocks for the each colors, a current storer 240A storing the currents CUR(X−1) of the previous frame for the display blocks for the each colors and a static image determiner 260 receiving the currents CUR(X) of the present frame for the display blocks for the each colors from the current calculator 220A and the currents CUR(X−1) of the previous frame for the display blocks for the each colors from the current storer 240A and determining the image displayed on the display panel as a static image based on the differences between the currents CUR(X−1) of the previous frame for the display blocks for the each colors and the currents CUR(X) of the present frame for the display blocks for the each colors.

The driving controller 200 may further include an image compensator 280 receiving a flag signal FL indicating the image displayed on the display pane is the static image from the static image determiner 260 and reduce the luminance for the input image data IMG(X).

For example, the driving controller 200 may convert the grayscale value of the input image data IMG to the current by a gamma conversion. The current of the input image data IMG corresponds to a luminance actually perceived by a user's eyes. Accordingly, when the image displayed on the display panel is determined as the static image using the current of the input image data IMG, the accuracy of the determination of the static image may be enhanced compared to a case in which the static image is determined using the grayscale value of the input image data IMG.

According to the present embodiment, the image displayed on the display panel is determined as the static image based on the differences between the currents CUR(X−1) of the previous frame and the currents CUR(X) of the present frame for the display blocks for the each colors to enhance an accuracy of the determination of the static image.

Accordingly, an error mistakenly determining a moving image with little movements between frames and a moving image which is dark overall as a static image may be prevented.

Therefore, when the same image is displayed on the display panel for a long time, the luminance of the display image may reduce so that the afterimage of the display panel 100 may be prevented and the power consumption of the display apparatus may be reduced.

Figure 16:
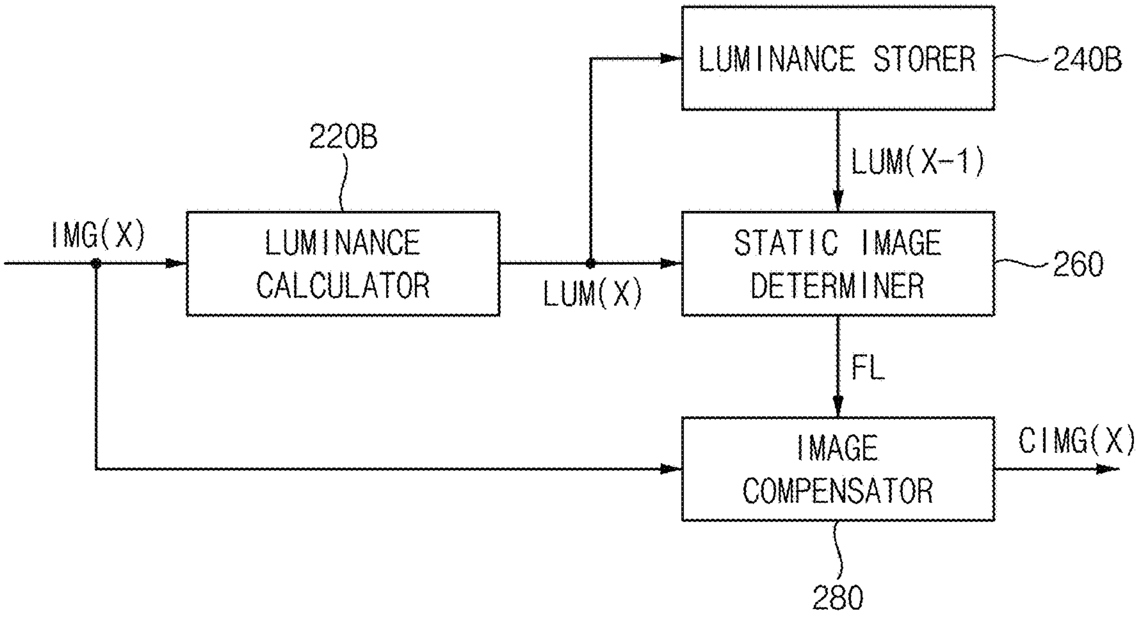
FIG. 16 is a block diagram illustrating a driving controller of a display apparatus according to an embodiment of the present inventive concept.

FIG. 16 is a block diagram illustrating a driving controller 200 of a display apparatus according to an embodiment of the present inventive concept.

The display apparatus according to the present embodiment is substantially the same as the display apparatus of the previous embodiment explained referring to FIGS. 1 to 14 except that the driving controller determines the image displayed on the display panel as the static image not based on the loads of the frames but based on luminances of the frames. Thus, the same reference numerals will be used to refer to the same or like parts as those described in the previous embodiment of FIGS. 1 to 14 and any repetitive explanation concerning the above elements will be omitted.

Referring to FIGS. 1 to 8, 10 to 14 and 16, the driving controller 200 may include a luminance calculator 220B calculating luminances LUM(X−1) of the previous frame and luminances LUM(X) of the present frame for the display blocks for the each colors, a luminance storer 240B storing the luminances LUM(X−1) of the previous frame for the display blocks for the each colors and a static image determiner 260 receiving the luminances LUM(X) of the present frame for the display blocks for the each colors from the luminance calculator 220B and the luminances LUM(X−1) of the previous frame for the display blocks for the each colors from the luminance storer 240B and determining the image displayed on the display panel as a static image based on the differences between the luminances LUM(X−1) of the previous frame for the display blocks for the each colors and the luminances LUM(X) of the present frame for the display blocks for the each colors.

The driving controller 200 may further include an image compensator 280 receiving a flag signal FL indicating the image displayed on the display panel as the static image from the static image determiner 260 and operating the luminance decrease for the input image data IMG(X).

For example, the driving controller 200 may convert the grayscale value of the input image data IMG to the luminance by a gamma conversion. The luminance of the input image data IMG is actually perceived by a user's eyes. Accordingly, when the image displayed on the display panel is determined as the static image using the luminance of the input image data IMG, the accuracy of the determination of the static image may be enhanced compared to a case in which the static image is determined using the grayscale value of the input image data IMG.

According to the present embodiment, the static image may be determined based on the differences between the luminances LUM(X−1) of the previous frame and the luminances LUM(X) of the present frame for the display blocks of the display panel 100 for the each colors to enhance an accuracy of the determination of the static image.

Accordingly, an error mistakenly determining a moving image with little movements between frames and a moving image which is dark overall as a static image may be prevented.

Therefore, when the same image is displayed on the display panel for a long time, the luminance of the display image may reduce so that the afterimage of the display panel 100 may be prevented and the power consumption of the display apparatus may be reduced.

Figure 17:
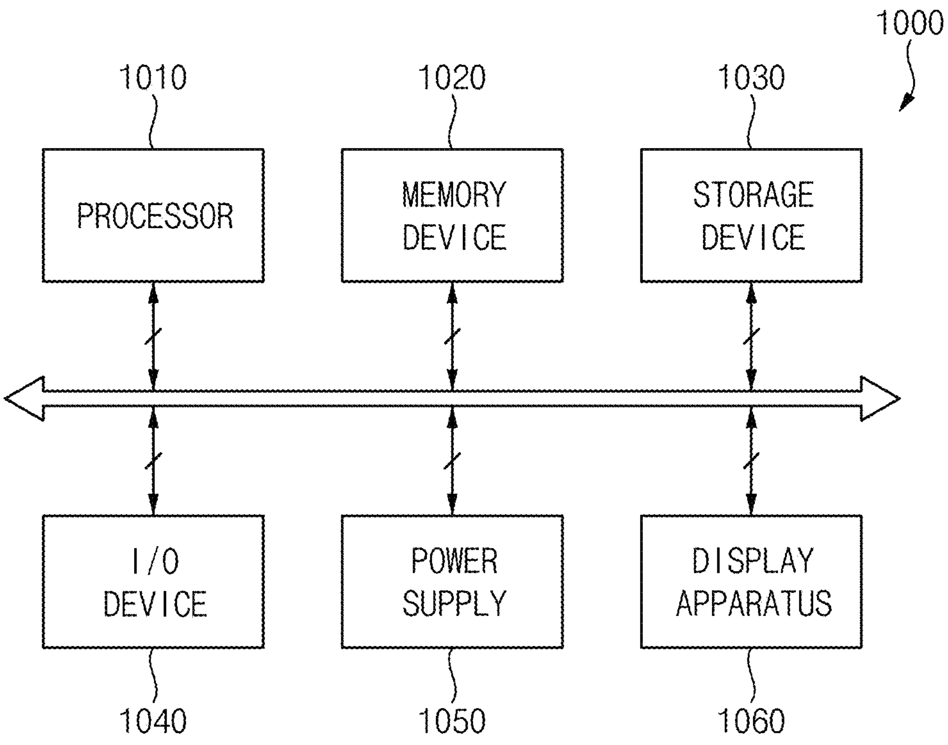
FIG. 17 is a block diagram illustrating an electronic apparatus according to an embodiment of the present inventive concept.
Figure 18:
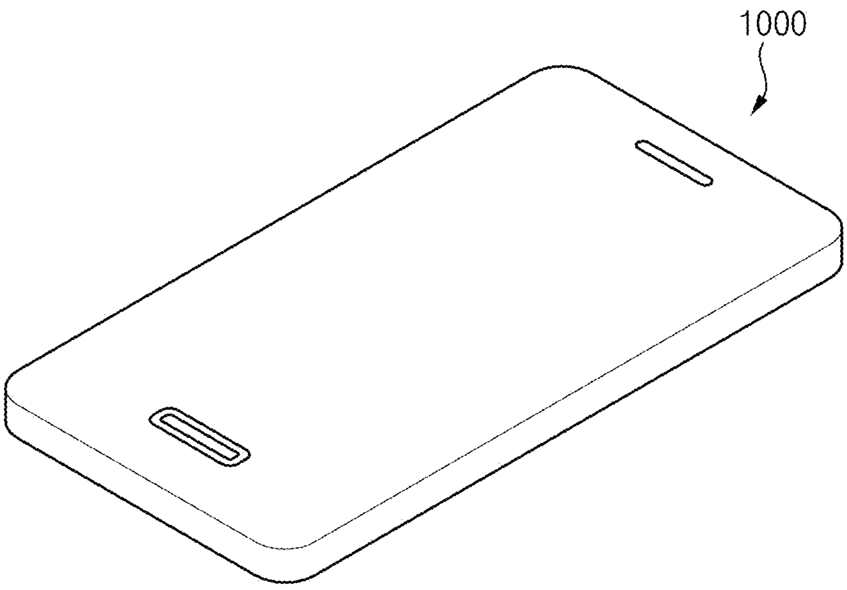
FIG. 18 is a diagram illustrating an example in which the electronic apparatus of FIG. 17 is implemented as a smartphone.
Figure 19:
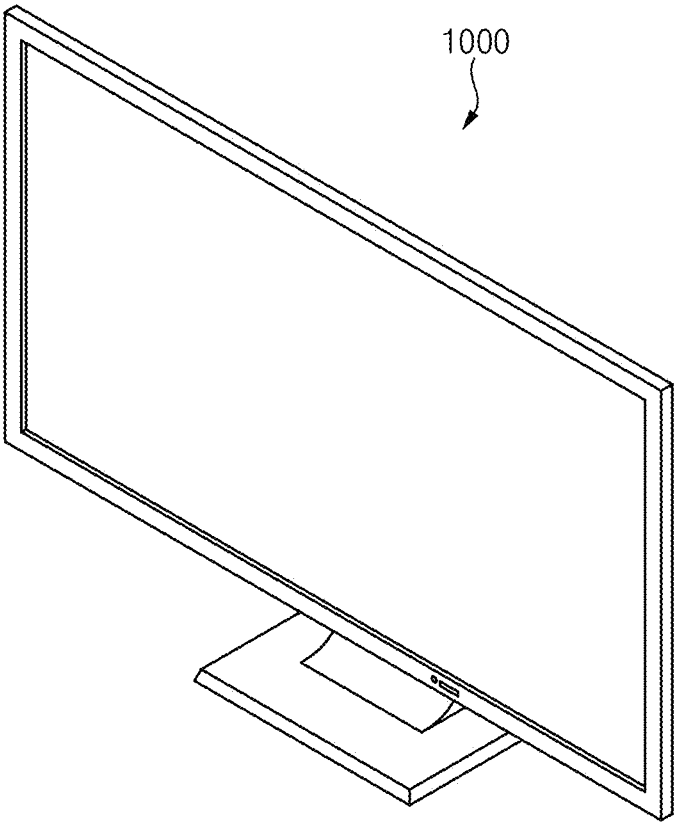
FIG. 19 is a diagram illustrating an example in which the electronic apparatus of FIG. 17 is implemented as a monitor.

FIG. 17 is a block diagram illustrating an electronic apparatus 1000 according to an embodiment of the present inventive concept. FIG. 18 is a diagram illustrating an example in which the electronic apparatus 1000 of FIG. 17 is implemented as a smartphone. FIG. 19 is a diagram illustrating an example in which the electronic apparatus 1000 of FIG. 17 is implemented as a monitor.

Referring to FIGS. 17 to 19, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 18, the electronic apparatus 1000 may be implemented as a smartphone. In an embodiment, as illustrated in FIG. 19, the electronic apparatus 1000 may be implemented as a monitor. However, the electronic apparatus 1000 is not limited thereto. For example, the electronic apparatus 1000 may be implemented as a television, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 20:
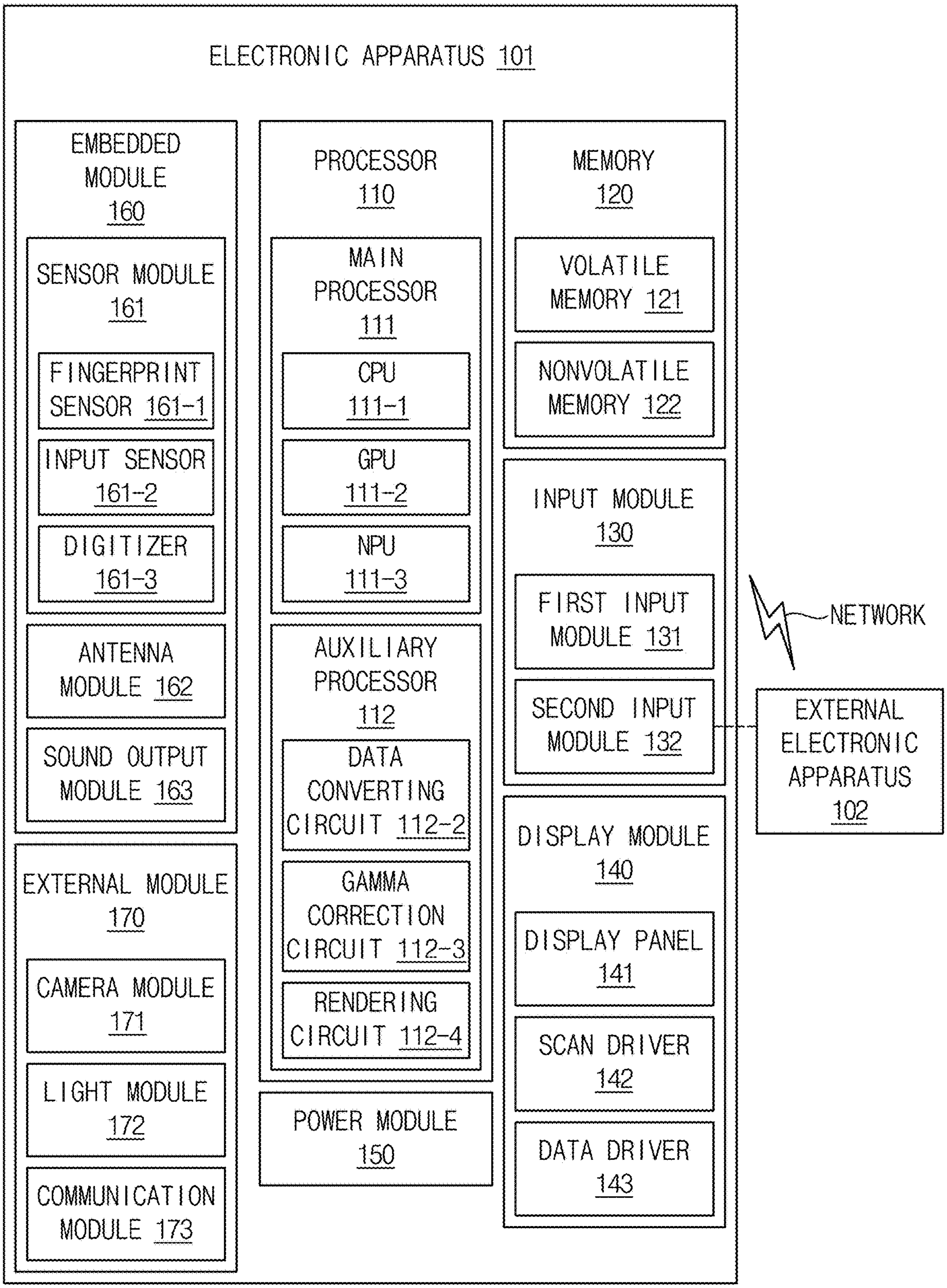
FIG. 20 is a block diagram illustrating an electronic apparatus according to an embodiment of the present inventive concept.

FIG. 20 is a block diagram illustrating an electronic apparatus 101 according to an embodiment of the present inventive concept.

Referring to FIGS. 1 to 20, an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g., a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one of the above-described elements may be omitted or one or more other apparatus may be added. According to an embodiment, some of the above-described elements (e.g., the sensor module 161, an antenna module 162 or the sound output module 163) may be integrated into another element (e.g., the display module 140).

The processor 110 may execute software to control at least one other element (e.g., hardware or software element) of the electronic apparatus 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one of a central processing unit (CPU) 111-1 and an application processor (AP). The main processor 111 may further include any one or more of a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g., a single chip) or each may be implemented as independent elements (e.g., in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance according to characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one of the data converting circuit 112-2, the gamma correction circuit 112-3 and the rendering circuit 112-4 may be integrated into another element (e.g. the main processor 111 or the controller). At least one of the data converting circuit 112-2, the gamma correction circuit 112-3 and the rendering circuit 112-4 may be integrated into a data driver 143 to be described later.

The memory 120 may store various data used by at least one element (e.g., the processor 110 or the sensor module 161) of the electronic apparatus 101 and input data or output data for commands related thereto. The memory 120 may include at least one of the volatile memory 121 and the nonvolatile memory 122.

The input module 130 may receive commands or data used to the elements (e.g., the processor 110, the sensor module 161 or the sound output module 163) of the electronic apparatus 101 from the outside of the electronic apparatus 101 (e.g., the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g., a button) or a pen (e.g., a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g., a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

The scan driver 142 may be mounted on the display panel 141 as a driving chip. Alternatively, the scan driver 142 may be integrated on the display panel 141. For example, the scan driver 142 may include an amorphous silicon TFT gate driver circuit (ASG) integrated on the display panel 141, a low temperature polycrystaline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. The light emission driver may be formed independently from the scan driver 142. Alternatively, the light emission driver and the scan driver 142 may be integrally formed.

The data driver 143 receives a control signal from the controller and converts the image data into an analog voltage (e.g., the data voltage) and output the data voltages to the display panel 141 in response to the control signal.

The data driver 143 may be integrated into another element (e.g., the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one of the fingerprint sensor 161-1, the input sensor 161-2 and a digitizer 161-3.

The fingerprint sensor 161-1 may generate a data value corresponding to a user's fingerprint. The fingerprint sensor 161-1 may include one of an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure biosignals such as a blood pressure, a moisture, or a body fat. For example, when a user touches a part of his body to a sensor layer or a sensing panel and does not move for a certain period of time, the input sensor 161-2 may detect the biosignal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one of the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one of the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The present inventive concept may not be limited to a position of the sensing panel.

At least one of the fingerprint sensor 161-1, the input sensor 161-2 and the digitizer 161-3 may be embedded in the display panel 141. For example, at least one of the fingerprint sensor 161-1, the input sensor 161-2 and the digitizer 161-3 is formed simultaneously with the display panel 141 through a process of forming elements included in the display panel 141 (e.g., light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an IR (infrared) sensor, a biosensor, a temperature sensor, a humidity sensor or an illuminance sensor.

The antenna module 162 may include one or more antennas for transmitting a signal or power to outside or receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g., the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g., LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or an ultra-path interconnect (UPI) link to exchange signals (e.g., commands or data) with each other. The processor 110 may communicate with the display module 140 through an agreed interface. For example, the processor 110 may communicate with the display module 140 through any one of the above communication methods. The present invention may not be limited to the above communication methods.

The electronic apparatus 101 according to various embodiments disclosed in the disclosure may be various types of apparatuses. For example, the electronic apparatus 101 may include at least one of a monitor, a portable communication apparatus (e.g., a smart phone), a computer apparatus, a portable multimedia apparatus, a portable medical apparatus, a camera, a wearable device and a home appliance. The electronic apparatus 101 according to the embodiment of the disclosure may not be limited to the aforementioned apparatuses.

For example, the display panel 100 of FIG. 1 may correspond to the display panel 141 of FIG. 20. For example, the driving controller 200 of FIG. 1 may correspond to the controller of the auxiliary processor 112 of FIG. 20. For example, the gate driver 300 of FIG. 1 may correspond to the scan driver 142 of FIG. 20. For example, the data driver 500 of FIG. 1 may correspond to the data driver 143 of FIG. 20.

According to the embodiments of the display apparatus, the method of driving the display panel using the display apparatus and the electronic apparatus including the display apparatus, the accuracy of the determination of the static image may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept.

Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A display apparatus comprising:

a display panel including a plurality of display blocks;

a data driver configured to output data voltages to the display panel; and a driving controller configured to control the data driver, wherein the driving controller is configured to calculate differences between loads of a previous frame and loads of a present frame for the plurality of display blocks for each colors, to determine whether an image is a static image or not based on the differences between the loads of the previous frame and the loads of the present frame for the plurality of display blocks for the each colors, and to reduce luminance of the image when the image is determined as the static image, wherein the driving controller is configured to determine a maximum value among absolute values of the differences between the loads of the previous frame and the loads of the present frame for the plurality of display blocks for the each colors, and wherein the driving controller is configured to generate a sensitivity value by normalizing the maximum value to a ratio of a difference between a maximum load and a minimum load.

2. The display apparatus of claim 1, wherein, when a load of an X−1-th frame of a first color in a first display block is LOAD (X−1, R1), a load of an X-th frame of the first color in the first display block is LOAD (X, R1), a load of the X−1-th frame of the first color in a second display block is LOAD (X−1, R2), a load of the X-th frame of the first color in the second display block is LOAD (X, R2), a load of the X−1-th frame of the first color in an N-th display block is LOAD (X−1, RN), a load of the X-th frame of the first color in the N-th display block is LOAD (X, RN), a load of the X−1-th frame of a second color in the first display block is LOAD (X−1, G1), a load of the X-th frame of the second color in the first display block is LOAD (X, G1), a load of the X−1-th frame of the second color in the second display block is LOAD (X−1, G2), a load of the X-th frame of the second color in the second display block is LOAD (X, G2), a load of the X−1-th frame of the second color in the N-th display block is LOAD (X−1, GN), a load of the X-th frame of the second color in the N-th display block is LOAD (X, GN), a load of the X−1-th frame of a third color in the first display block is LOAD (X−1, B1), a load of the X-th frame of the third color in the first display block is LOAD (X, B1), a load of the X−1-th frame of the third color in the second display block is LOAD (X−1, B2), a load of the X-th frame of the third color in the second display block is LOAD (X, B2), a load of the X−1-th frame of the third color in the N-th display block is LOAD (X−1, BN), a load of the X-th frame of the third color in the N-th display block is LOAD (X, BN), the maximum value is MAX (|LOAD (X−1, R1)-LOAD (X, R1)|, |LOAD (X−1, R2)-LOAD (X, R2)|, . . . , |LOAD (X−1, RN)-LOAD (X, RN)|, |LOAD (X−1, G1)-LOAD (X, G1)|, |LOAD (X−1, G2)-LOAD (X, G2)|, . . . , |LOAD (X−1, GN)-LOAD (X, GN)|, |LOAD (X−1, B1)-LOAD (X, B1)|, |LOAD (X−1, B2)-LOAD (X, B2)|, . . . , |LOAD (X−1, BN)-LOAD (X, BN)|).

3. The display apparatus of claim 1, wherein, when the sensitivity value is Δ, an absolute value of a difference between a load of an X−1-th frame of a first color in a first display block and a load of an X-th frame of the first color in the first display block is D(R1), an absolute value of a difference between a load of the X−1-th frame of the first color in a second display block and a load of the X-th frame of the first color in the second display block is D(R2), an absolute value of a difference between a load of the X−1-th frame of the first color in an N-th display block and a load of the X-th frame of the first color in the N-th display block is D(RN), an absolute value of a difference between a load of the X−1-th frame of a second color in the first display block and a load of the X-th frame of the second color in the first display block is D(G1), an absolute value of a difference between a load of the X−1-th frame of the second color in the second display block and a load of the X-th frame of the second color in the second display block is D(G2), an absolute value of a difference between a load of the X−1-th frame of the second color in the N-th display block and a load of the X-th frame of the second color in the N-th display block is D(GN), an absolute value of a difference between a load of the X−1-th frame of a third color in the first display block and a load of the X-th frame of the third color in the first display block is D(B1), an absolute value of a difference between a load of the X−1-th frame of the third color in the second display block and a load of the X-th frame of the third color in the second display block is D(B2), an absolute value of a difference between a load of the X−1-th frame of the third color in the N-th display block and a load of the X-th frame of the third color in the N-th display block is D(BN), the maximum load is MAXLO, the minimum load is MINLO and a number of the plurality of display blocks of the display panel is N, is satisfied.

4. The display apparatus of claim 1, wherein, when the sensitivity value is less than a first threshold value, the driving controller is configured to determine data of the present frame as static image data.

5. The display apparatus of claim 4, wherein, when a maintaining time of the static image is greater than a second threshold value, the driving controller is configured to reduce the luminance of the image.

6. The display apparatus of claim 1, wherein the driving controller comprises:

a load calculator configured to calculate the loads of the previous frame and the loads of the present frame for the plurality of display blocks for the each colors;

a load storer configured to store the loads of the previous frame for the plurality of display blocks for the each colors; and a static image determiner configured to receive the loads of the present frame for the plurality of display blocks for the each colors from the load calculator and the loads of the previous frame for the plurality of display blocks for the each colors from the load storer and to determine whether the image is the static image or not based on the differences between the loads of the previous frame for the plurality of display blocks for the each colors and the loads of the present frame for the plurality of display blocks for the each colors.

7. The display apparatus of claim 6, wherein the driving controller further comprises an image compensator configured to receive a flag signal indicating the image as the static image from the static image determiner and to reduce the luminance when the image is determined as the static image.

8. A method of driving a display panel, the method comprising calculating differences between loads of a previous frame and loads of a present frame for display blocks for each colors in the display panel;

determining whether an image is a static image or not based on the differences between the loads of the previous frame and the loads of the present frame for the plurality of display blocks for the each colors;

reducing luminance of the image when the image is determined as the static image to generate compensated image data; and generating data voltages based on the compensated image data and outputting the data voltages to the display panel, wherein the determining whether the image is a static image or not comprises: determining a maximum value among absolute values of the differences between the loads of the previous frame and the loads of the present frame for the plurality of display blocks for the each colors, and wherein the determining whether the image is a static image or not further comprises: generating a sensitivity value by normalizing the maximum value to a ratio of a difference between a maximum load and a minimum load.

9. The method of claim 8, wherein the determining whether the image is a static image or not further comprises: determining data of the present frame as static image data when the sensitivity value is less than a first threshold value.

10. The method of claim 9, wherein the reducing luminance of the image when the imaged is determined as the static image comprises:

reducing the luminance of the image when a maintaining time of the static image is greater than a second threshold value.

11. A display apparatus comprising:

a display panel including a plurality of display blocks; a data driver configured to output data voltages to the display panel; and a driving controller configured to control the data driver, wherein the driving controller is configured to calculate differences between currents or luminances of a previous frame and currents or luminances of a present frame for the plurality of display blocks for each colors, to determine whether an image is a static image or not based on the differences between the currents or luminances of the previous frame and the currents or luminances of the present frame for the plurality of display blocks for the each colors, and to reduce luminance of the image when the image is determined as the static image, wherein the driving controller is configured to determine a maximum value among absolute values of the differences between the currents or luminances of the previous frame and the currents or luminances of the present frame for the plurality of display blocks for the each colors, and wherein the driving controller is configured to generate a sensitivity value by normalizing the maximum value to a ratio of a difference between a maximum current or luminance and a minimum current or luminance.

12. The display apparatus of claim 11, wherein, when the sensitivity value is less than a first threshold value, the driving controller is configured to determine data of the present frame as static image data.

13. The display apparatus of claim 11, wherein the driving controller comprises:

a current calculator configured to calculate the currents of the previous frame and the currents of the present frame for the plurality of display blocks for the each colors;

a current storer configured to store the currents of the previous frame for the plurality of display blocks for the each colors; and a static image determiner configured to receive the currents of the present frame for the plurality of display blocks for the each colors from the current calculator and the currents of the previous frame for the plurality of display blocks for the each colors from the current storer and to determine the image as the static image based on the differences between the currents of the previous frame for the plurality of display blocks for the each colors and the currents of the present frame for the plurality of display blocks for the each colors.

14. The display apparatus of claim 11, wherein the driving controller comprises:

a luminance calculator configured to calculate the luminances of the previous frame and the luminances of the present frame for the plurality of display blocks for the each colors;

a luminance storer configured to store the luminances of the previous frame for the plurality of display blocks for the each colors; and a static image determiner configured to receive the luminances of the present frame for the plurality of display blocks for the each colors from the luminance calculator and the luminances of the previous frame for the plurality of display blocks for the each colors from the luminance storer and to determine the image as the static image based on the differences between the luminances of the previous frame for the plurality of display blocks for the each colors and the luminances of the present frame for the plurality of display blocks for the each colors.

15. An electronic apparatus comprising:

a display panel including a plurality of display blocks;

a data driver configured to output data voltages to the display panel;

a driving controller configured to control the data driver; and a processor configured to output input image data and an input control signal to the driving controller, wherein the driving controller is configured to calculate differences between loads of a previous frame and loads of a present frame for the plurality of display blocks for each colors, to determine whether an image is a static image or not based on the differences between the loads of the previous frame and the loads of the present frame for the plurality of display blocks for the each colors, and to reduce luminance of the image when the image is determined as the static image, wherein the driving controller is configured to determine a maximum value among absolute values of the differences between the loads of the previous frame and the loads of the present frame for the plurality of display blocks for the each colors, and wherein the driving controller is configured to generate a sensitivity value by normalizing the maximum value to a ratio of a difference between a maximum load and a minimum load.

* * * * *